Figure 1:
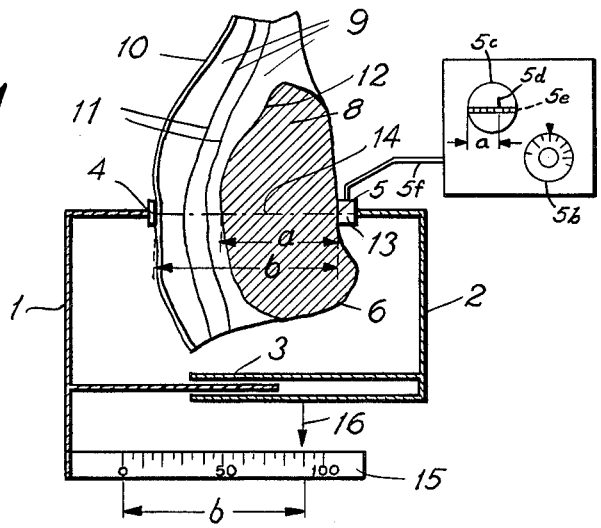

Jan. 19, 1965　　　S. A. LUND　　　3,165,923
NONDESTRUCTIVE MEASUREMENT OF THICKNESS
OF FAT LAYERS OF ANIMAL CARCASSES
Filed March 12, 1962　　　3 Sheets-Sheet 1

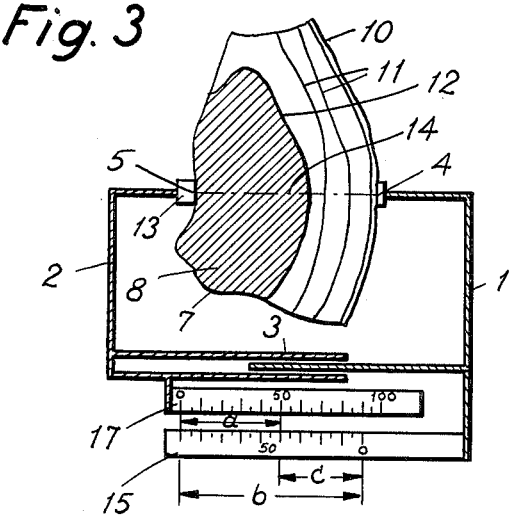
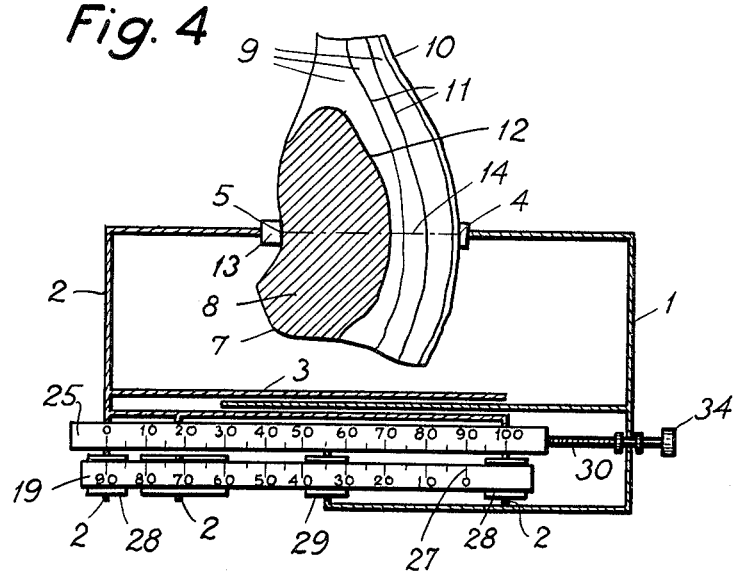

United States Patent Office 3,165,923
Patented Jan. 19, 1965

3,165,923
NONDESTRUCTIVE MEASUREMENT OF THICKNESS OF FAT LAYERS OF ANIMAL CARCASSES
Svend Aage Lund, Bistrup, Denmark, assignor to Dansk Svejsecentral, Copenhagen, Denmark, a company of Denmark
Filed Mar. 12, 1962, Ser. No. 178,966
Claims priority, application Denmark, Mar. 13, 1961, 1067/61
10 Claims. (Cl. 73—67.8)

The invention relates to a method of non-destructive measurement of the thickness of layers of fat, more particularly outer layers of fat, of animal carcasses by means of the impulse-echo method or the resonance method and with the use of ultra-acoustic oscillations.

In the quality determination and classification of animal carcasses according to their value the thickness of the outer layer of fat of the carcasses constitutes a primary criterion of quality, and great efforts have therefore been made to develop suitable methods for a safe and accurate determination of the thickness of such layers.

In the method usually adopted so far use is made of a knife-shaped tool, a so-called stiletto, which is provided with a graduation. After cutting through the outer skin of the carcass the stiletto is passed into the layer of fat until the point of it encounters a certain resistance on reaching the muscular tissue lying beneath the fat layer. With the stiletto in this position the thickness of the fat layer is read on the said graduation. This known method of measuring has certain drawbacks since it involves an undesired injury of skin and layer of fat alike and a single stab gives only a strictly local determination of the thickness which may vary widely within limited areas of the surface of the body; furthermore, it is difficult to perceive with reasonable accuracy the resistance offered by the muscular tissue and the resistance may readily be confused with the resistance encountered by penetrating the connective tissue embedded in the layer of fat.

Due to the desire to obtain a greater measuring accuracy a mechanical optical measuring method has been developed, using a wedge-shaped optical instrument with outside graduation. The instrument is forced through skin and fat layer to a slight distance into the underlying muscular tissue. By observing the change of colour at the dividing surface between fat layer and muscular tissue it is possible to bring the instrument into position such that the thickness of the fat layer may be read on the said graduation. This known method has, however, also been found both inadequate and unreliable, partly because it involves greater injury to skin and layer of fat than the use of a stiletto, partly because a single stab still gives only a very local determination of the thickness, and further because it has not been possible to obtain the desired accurate measurement of the fat layer, the thickness of which should preferably be determined at an accuracy of about 1 mm.

Finally, attempts have been made to determine the thickness of the fat layer by acoustic measurement according to the impulse-echo method with the use of a piezo-electric crystal connected with suitable electronic equipment which may cause the crystal to emit sound oscillations of a high frequency and which may register sound oscillations reflected to the crystal in such a manner that the distance covered by the sound oscillations may be determined. When the rapidly oscillating crystal is brought into direct, intimate contact with the outer skin of the animal carcass, sound oscillations or waves are transmitted through the layer of fat. Part of the sound energy is reflected back to the crystal as an echo from the dividing surface between the fat layer and the underlying muscular tissue and is registered by the electronic equipment in such manner that the thickness of the fat layer may be read directly.

Not withstanding that the electro-acoustic method of measurement in principle has been found very suitable for its purpose in tests carried out under actual conditions, it has, however, simultaneously been found to involve such drawbacks that it has not been adopted in practice as the regular quality inspection method of animal carcasses in bacon factories. Firstly, a direct, very intimate contact is required between the crystal and the surface of the carcass to enable the sound oscillations to enter the layer of fat. To obtain the the contact it is necessary to press the crystal against the surface of the carcass. As a result, there will be an uncontrollable compression of the fat layer which after the killing is very soft and yielding, and the compression involves an impermissible inaccuracy in the determination of the actual thickness of the layer of fat. Secondly, in many cases a burning or singeing of the outer surface of the carcasses is effected in direct association with the killing. As a result the skin or the surface of the fat layer is converted into a crust which is wholly impenetrable to sound oscillations of the frequencies and intensities applicable for the measurements involved. Thirdly, the connective tissue embedded in the layer of fat reflects more or less powerful reflections of the sound oscillations, dependent upon the individual nature of the tissue. These "false" echoes disturb the operation of measuring apparatus and may render it difficult or wholly impossible even for a very skillful operator to identify with certainty the indication from the actual dividing surface between a fat layer and muscular tissue. Similar false reflections may occur due to even small amounts of air from a nearby cut in the carcass having penetrated into the layer of fat.

The present invention has for its object to eliminate the aforesaid drawbacks and inefficiencies by providing a suitable, quick and more exact method of measuring the outer fat layer of animal carcasses and by providing a suitable and handy measuring tool for carrying the method into effect.

An essential feature of the method according to the invention is that the ultra-acoustic oscillations are transmitted to the carcass locally and at least in one fixed direction from the meat side of the body with a view to measuring the thickness of the muscular tissue of the meat side, a measurement of the total thickness of layer of fat and muscular tissue being carried out beforehand, simultaneously or later by mechanical means and in the same fixed directions.

The result obtained is a powerful unique and well defined echo from the dividing surface between the muscular tissue and the layer of fat so that the thickness of the muscular tissue located between the point where the acoustic oscillations are supplied and the said dividing surface may be determined quickly and with substantial accuracy, and by determining the difference between the total thickness measured by the mechanical means and the thickness of the muscular tissue as determined by the electro-acoustic measurement the thickness of the outer layer of fat itself may as desired be determined quickly and with substantial accuracy.

Furthermore, by the method according to the invention the following substantial advantages are obtained in practice.

Firstly, the measuring operation may be performed quickly and with great accuracy by any operator after very brief and simple instructions.

Secondly, the measuring operation may be performed without unduly interfering with the carcass, that is, without causing any injury whatever to it.

Thirdly, the thickness of the layer of fat may, if desired, quickly be measured at several points on the outer surface of the carcass so that the maximum thickness occurring within a specific area may be determined.

Fourthly, measuring of the thickness of the layer of fat is wholly independent of any burning or singeing of the outer surface of the carcass, effected prior to the measuring operation, since the sound oscillations are not to pass through this surface.

Fifthly, measuring of the thickness of the layer of fat is wholly independent of the existence of connective tissues or air that has penetrated into the layer of fat since the sound oscillations do not pass through the fat layer itself.

The invention is furthermore concerned with a measuring tool for carrying the method according to the invention into effect and of the kind having a measuring fork the two prongs of which are each provided with a contact surface and are displaceable towards and away from each other in such manner that the contact surfaces may be disposed in position each on its separate side of a carcass that is cut open so as to contact an outer and an inner surface of the carcass, and an essential feature of the tool according to the invention is that one contact surface is provided with an electro-acoustic converter such as a piezoelectric or magneto-strictive vibrator which is connected to an electro-acoustic oscillator and to an echo or resonance recording instrument for electro-acoustic oscillations for visible registration of the thickness of the muscular tissue of the carcass. The said vibrator rests in contact with the muscular tissue of the inner surface for effective transmission of ultra-acoustic oscillations to the muscular tissue, whereas the central part of the other contact surface is located on the radiation axis of the converter and has a light mechanical contact with the outer skin of the carcass or with the free surface of the fat layer. The tool is provided with mechanical measuring devices for indicating the distance between the two contact surfaces.

The result obtained is a convenient and handy measuring tool which may be readily placed in position on the cut carcass, and the measurement of the thickness of the layer of fat is wholly independent of the pressure at which the converter is pressed against the inside surface of the muscular issue. The consequent compression of the muscular tissue is automatically eliminated due to the combined acoustic and mechanical measurement. At the same time the layer of fat remains in its natural, untouched condition during the measuring operation since the mechanical measurement of the distance only requires the other contact surface to touch the outer surface of the carcass very lightly. Simultaneously the other contact surface makes it possible to make a very accurate definition of the locality on the outer surface of the carcass where the measurement operation is performed and the position of the two contact surfaces in relation to each other gives an accurate definition of the measuring direction used.

In one embodiment of the measuring tool according to the invention the mechanical measuring devices for indicating the distance consist of a mechanical first measuring rod mounted parallel with the radiation axis of the electro-acoustic converter and permanently connected with the first prong of the measuring fork. The measuring rod is calibrated in units of length, whereas a pointer or reading mark in permanent connection with the second prong of the measuring fork is mounted in such manner that the distance between the two contact surfaces may be read directly on the first measuring rod.

In another embodiment of the measuring tool according to the invention the pointer or reading mark is mounted on a mechanical second measuring rod extending parallel with and near the first measuring rod and is provided with a scale for units of length. The graduation of the scale reads in the opposite direction of the graduations of the first measuring rod and the location of its zero point corresponds to the location of the pointer or reading mark whereby the difference between the total thickness of muscular tissue and layer of fat as measured by the mechanical means and the thickness of the muscular tissue as determined by the electro-acoustic measurement may be read by a combined use of the two measuring rods.

In a third embodiment of the measuring tool according to the invention the recording instrument is of such design as to give a visible indication or recordng of the distance between the converter and the muscular tissue and the joint dividing surface of the layers of fat, and in a special convenient embodiment of the measuring tool according to the invention the visible registration extends along a measuring rod for the meat thickness incorporated in the recording instrument, the said measuring rod being calibrated in units of length, as a result of which the thickness of the muscular tissue may be read directly in units of length which may subsequently be subtracted from the total thickness of muscular tissue and layer of fat as measured by the mechanical means.

The first and the second measuring rod may in one embodiment of the measuring tool according to the invention be placed in such manner and provided with graduations on both of their surfaces so that they may be read from one side as well as from the other side of the plane of movement of the prongs of the measuring fork, and the maximum value of the first measuring rod and the zero point of the second measuring rod are on both surfaces of the measuring rods placed near the measuring rod prong carrying the converter. The result obtained is that the measuring rod may be used for measuring both one half and the other half of a carcass by simply turning the measuring fork 180 degrees and using such surfaces of the measuring rods as face the observer.

In one embodiment of the measuring tool according to the invention the first measuring rod is designed as a thin and bendable measuring tape one end of which is in fixed connection with the other prong of the measuring fork, the other end of the measuring tape, which is passed over a spring-loaded tightening mechanism, in fixed connection with the same prong, whereas the second measuring rod is divided into two divisional measuring rods both of which are likewise in fixed connection with the other prong of the measuring fork. The measuring tape has two measuring scales, staggered in relation to each other along the measuring tape, and extends over a set of rollers which are rotatably supported in the second prong of the measuring fork and over a single roller which is supported in the first prong of the measuring fork.

The result obtained is a doubled accuracy of reading of the measurement scales, and, in addition, these may be read from both sides of the plane of movement of the prongs.

In a preferred embodiment of the measuring tool according to the invention a worm drive mechanism is provided between the two prongs of the measuring fork. The screw-threaded spindle of the mechanism is retained so that it cannot be displaced longitudinally, but is rotatably mounted in one prong of the measuring fork, the worm wheel being rotatably supported by means of a friction clutch on a pin which is in permanent connection with the other prong of the measuring fork, whereby quick rough adjustment of the measuring tool so that its operation is highly facilitated and a subsequent fine adjustment effected by turning the screw manually are possible.

Figure 2:
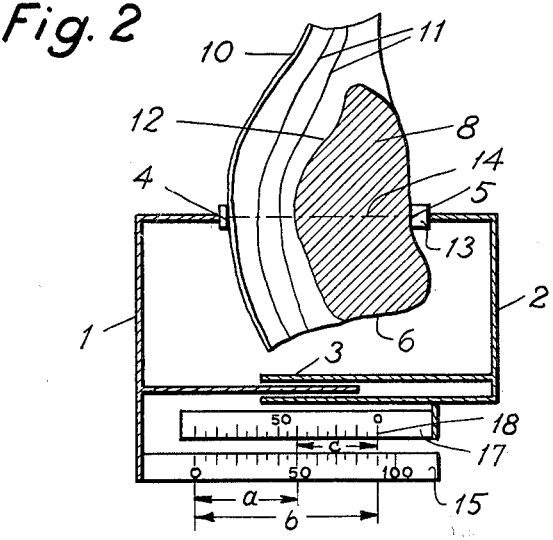
Figure 5:
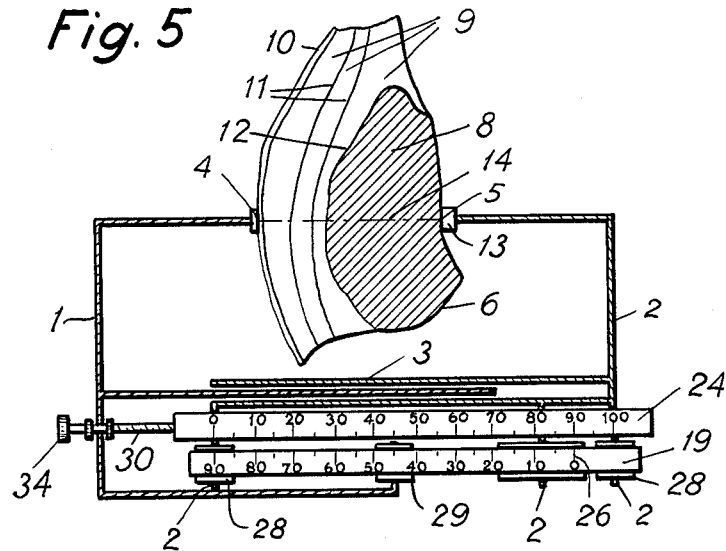
Figure 6:
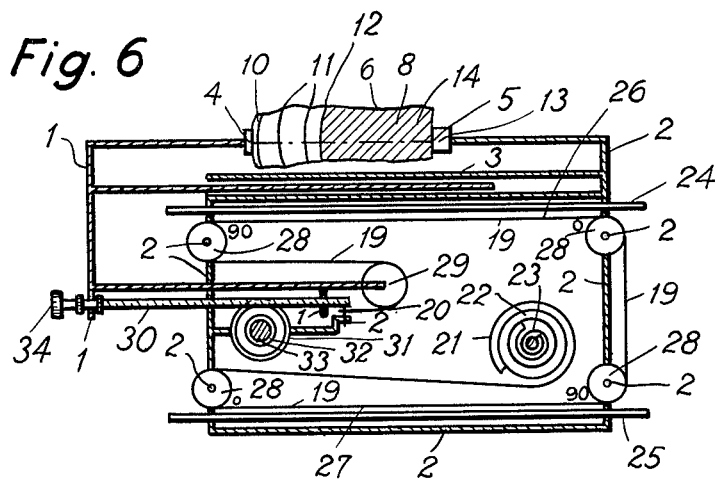

The invention will now be further described with reference to the drawing, in which FIGURE 1 is a schematic of a side view of an embodiment of a measuring tool for carrying the method according to the invention into effect and used for measuring on one half of a cut carcass illustrated in section;

FIGURE 2 is a diagram of a side view of another embodiment of the measuring tool according to the invention, used in the same manner, FIGURE 3 is a diagram of the same embodiment of FIG. 2 illustrated as being used for measuring on the other half of a cut carcass, FIGURE 4 is a diagram of a side view of a third embodiment of the measuring tool according to the invention, used for measuring on the other half of a cut carcass, FIGURE 5 is a diagram of a side view of the same embodiment used for measuring on the first half of a cut carcass, and FIGURE 6 is an underside view of the embodiment in FIGS. 4 and 5.

In the drawing are shown various embodiments of a measuring tool according to the invention and of the kind consisting of a measuring fork the prongs 1 and 2 of which are displaceable in relation to each other, for example guided in a telescope guide 3, and each provided with a contact surface 4 and 5, respectively, which by the displacement of the prongs 1 and 2 in relation to each other may be passed each towards its separate surface of a carcass that is cut open, for example, a pig carcass suspended by its hind legs and split into a left-side half 6 and a right-side half 7 held together below by the non-divided head of the carcass. The two halves of the pig body consist of interior muscular tissue 8, a fat layer 9 and outermost skin 10 and the layers 9 of fat are separated from each other by connective tissues 11 whereas muscular tissue and fat layers are separated from each other by a dividing surface 12 consisting of a special connective tissue.

One contact surface 5 of the measuring fork is provided with an electro-acoustic oscillator and an indicating or recording instrument 5a which is connected to an electro-acoustic converter 13 such as a piezo-electric or magneto-strictive vibrator resting in contact with the free surface of the muscular tissue 8 to provide effective transmission of ultra-acoustic oscillations from the electro-acoustic oscillator to the muscular tissue 8. The oscillator 5a is controlled by a tuning adjustor 5b and is provided with a record and indicating device 5c for example a cathode ray tube so that a visible indication $a$ of the muscle thickness can be obtained, for example as shown at 5d on a horizontal scale 5e. The oscillator 5a is connected in operation to the converter 13 by an electrical lead 5f. The central part of the other contact surface 4 is located on the radiation axis 14 of the converter 13 and is in light mechanical touch with the skin 10 or the free surface of the fat layer 9. From the converter 13 ultra-acoustic oscillations are transmitted into the muscular tissue and from the dividing surface 12 some of the oscillations are reflected back to the converter 13 so that they are registered by the deflection "$a$" on the scale 5e either as an echo, which is utilised in the known impulse-echo method of registration where the converter is supplied with impulses of a constant frequency, or the distance between the converter and the dividing surface is registered by the deflection "$a$" as a phenomenon of resonance, stationary oscillations being produced in the muscular tissue 8, which is utilised in the known resonance method in which the converter is supplied with an adjustable frequency. In the impulse-echo method the time interval between impulse and echo represents a measure of the distance covered by the oscillations through the muscular tissue, the said distance being equal to twice the distance $a$ from the converter 13 to the dividing surface 12. In the resonance method the frequency of the resonance represents a measure of the distance "$a$."

In both methods the thickness of the muscular tissue is thus determined in the direction of the axis of radiation, the thickness being, however, reduced somewhat in proportion to the original thickness of the muscular tissue owing to the pressure exerted by the converter on the surface of the muscular tissue. In order to eliminate any consequent inaccuracy of measurement, the measurement of the total thickness of fat layer and muscular tissue by the mechanical aids is normally effected with the measuring fork in exactly the same position as in the electro-acoustic measurement.

Parallel with the axis of radiation 14 of the converter 13 and in permanent connection with the first prong 1 of the measuring fork is provided a first measuring rod 15 which is calibrated in units of length, and in the embodiment of the measuring tool according to the invention as shown in FIGURE 1 there is a pointer or a distance mark 16 mounted in permanent connection with the second prong of the measuring fork in such manner that the distance "$b$" between the two surfaces of contact 4 and 5 may be read directly on the first measuring rod 5. By means of the measuring tool it is thus possible to measure mechanically the spatial distance "$b$" between such surface of contact 5 of the converter 13 as faces the muscular tissue 8 and the location of the skin 10 where the surface of contact 4 is located, and if the measuring fork is retained in the identical position at the mechanical measurement as at the electro-acoustic measurement or if the measuring fork is placed in the identical position at the two measuring operations the distance "$b$" will be determined in exactly the same direction as that of the electro-acoustic measurement of the thickness "$a$" of the muscular tissue, so that the thickness "$c$" of the layer of fat is determined as the difference "$c$"="$b$"—"$a$," that is, as the difference between the total thickness "$b$" of one half of the carcass, measured by mechanical aids, and the thickness "$a$" of the muscular tissues, measured acoustically, where "$a$" is determined by means of the indicating device 5c, while the length "$b$" is read directly on the first measuring rod 15.

In a suitable embodiment of the measuring tool according to the invention the pointer or distance mark 16 is placed on a second measuring rod 17 which, as shown in FIGURE 2, extends parallel with and near the first measuring rod 15 and is provided with a scale of units of length, the units of length reading in the direction opposite that of the graduations of the first measuring rod 15. The location of its zero point 18 corresponds to the location of the pointer or distance mark 16 in relation to the prong 2. The difference "$c$"="$b$"—"$a$" may thus be read opposite the graduation on the first measuring rod 15 which corresponds to a units of length, in which the valve of $a$ is known from the electro-acoustic measurement, that is, it is determined by means of the device 5c.

In one embodiment of the measuring tool according to the invention the recording instrument is of such design as to give a visible indication or recording of the distance "$a$" between the converter 13 and the joint dividing surface 12 of the muscular tissue 8 and the fat layer 9 either by the indication 5d in FIG. 1 or by a number read on a scale or a counter, not shown. However, a special feature of a very suitable embodiment of the measuring tool according to the invention consists in such an arrangement that the visible registration extends along a measuring rod for determining the meat thickness, provided as a built-in unit in the recording instrument and calibrated in units of length so that the distance "$a$" between the converter 13 and the dividing surface 12 may be read directly in units of length on the said built-in meat thickness measuring rod for determination of the graduation of the first measuring rod 15 opposite which the desired difference "$c$"="$b$"—"$a$" may be read.

FIGURE 3 shows the measuring tool arranged for measuring thicknesses of a right-side half 7 of the pig carcass. The measuring tool has in this case to be turned 180 degrees so that the converter 13 is resting in contact with the outer surface of the muscular tissue 8. The measuring rods 15 and 17 are in that case viewed in the position they have in relation to that shown in FIGURE 2. To relieve this drawback the first measuring rod 15 and the second measuring rod 17 are in one embodiment of the measuring tool according to the invention so placed and provided with graduations on both of their surfaces that they may be read both from one side and from the other side of the plane of movement of the measuring fork prongs, and the maximum value of the first measuring rod 15 and the zero point of the second measuring rod 17 are on either surface of the measuring rods placed nearest the measuring rod prong 2 that carries the converter 13. The result obtained is that the distance "a" determined by the electro-acoustic measurement and read directly from the recording instrument has always to be measured on the scale graduated from left to right, whereas the result "c" is always to be read on the scale graduated from right to left, regardless whether the measuring fork is placed as shown in FIGURES 1 and 2 or as shown in FIGURE 3, which will prevent wrong reading of the result "c." As a further precaution the scale corresponding to the electro-acoustic measurement may, for example, be red and be described as the meat scale, whereas the scale indicating the result may be white and be described as the fat scale. In the cases illustrated in FIGURES 2 and 3 "a"= 50 units, "b"=90 units and "c"=40 units. By comparing FIGURES 2 and 3 it will be seen that in FIGURE 2 the first measuring rod 15 corresponds to the meat scale, whereas the second measuring rod 17 corresponds to the fat scale, while the reverse is the case in FIGURE 3.

To improve the reading accuracy of the measuring tool the measuring fork and the measuring rods 15 and 17 provided in connection with same may in one embodiment of the tool according to the invention be coupled together mechanically in such manner that the displacement of the two measuring rods in relation to each other corresponds to a multiple of the distance between the two surfaces of contact 4 and 5. This may, for example, be brought about by an embodiment according to the invention shown in FIGURES 4, 5 and 6.

In this embodiment the first measuring rod is designed as a thin, bendable measuring tape 19 permanently attached at its one end 20 to the second prong 2 of the measuring fork, the other end 21 of the measuring tape being over a tensioning mechanism 22 which is loaded with a spring 23 in permanent connection with the same prong whereas the second measuring rod is divided into two divisional measuring rods 24 and 25 which are likewise in permanent connection with the second prong 2 of the measuring fork. The measuring tape 19 extends partly over a set of rollers 28, which are rotatably mounted in the second prong 2 of the measuring fork, partly over a single roller 29 which is supported in the first prong 1 of the measuring fork. The measuring tape 19 has two scales 26 and 27 staggered along the tape and one of which, being closer to the divisional measuring rod 24, is divided into units of length from the right to the left as shown in the drawing, whereas the other scale which is closer to the divisional measuring rod 25 is graduated from the left to the right as shown in the drawing. The two divisional measuring rods 24 and 25 have longitudinal graduations extending in the opposite direction of the scale lying closest to the divisional measuring rod involved on the measuring tape 19.

The result obtained is that the movement of the measuring tape 19 in relation to the divisional measuring rods 24 and 25 is twice as great as the displacement of the contact surfaces 4 and 5 in relation to each other. The graduations 26 and 27 on the measuring tape 19 and the longitudinal graduations of the divisional measuring rods 24 and 25 are therefore made on the scale of 2:1 compared with the length of the movement of the contact surfaces in relation to each other so that it is possible to read the said displacement in units of length directly from the scales.

To ensure a quick rough adjustment of the contact surfaces 4 and 5, one embodiment of the measuring tool according to the invention may be provided with a worm gear mechanism 30, 31 between the two prongs 1 and 2 of the measuring fork, the screwthread spindle 30 of the said worm gear mechanism being retained against longitudinal displacement but rotatably supported in the prong 1 of the measuring fork and its worm wheel 31 being rotatably supported by means of a friction clutch 32 on a shaft 33 which is in permanent connection with the second prong 2 of the measuring fork.

The result obtained is that the worm gear mechanism by a first rough adjustment of the prongs of the measuring fork may be caused to slide in the friction clutch, after which a fine adjustment of the position of the prongs in relation to each other may be effected by manually turning the screwthreaded spindle 30 which is provided with a knob 34 for this purpose.

On comparing FIGURES 4 and 5 it will be seen that the scales 26 and 27 of the measuring tape 19 and the graduations 24 and 25 of the divisional measuring rods 24 and 25 are placed in such manner that readings of the total thickness of the layers of fat, both when measuring a left-hand half 6 and a right-hand half 7 of the pig carcass, are taken from the measuring tape 19 and in either case on scales indicating increasing values in figures in the same direction as viewed by the observer, which in the embodiment disclosed means from the right to the left. Consequently, the risk of misreading and of confusing the scale for muscular tissue with the scale for fat layer is reduced, simultaneously with the greater graduations giving improved reading accuracy.

The embodiments of the measuring tool according to the invention disclosed in the foregoing may be modified in many different ways while retaining the disclosed fundamental features of the method provided by the present invention. Tests in practice have disclosed, however, that already with the embodiments shown more particularly in FIGURES 4-6 very satisfactory measuring results are obtainable and that the difficulties involved in measuring the thickness of the outer layer of fat of animal carcasses in accordance with the methods hitherto used have thus been substantially overcome by the invention.

What I claim and desire to secure by Letters Patent is:

1. A method of non-destructive measurement of the thickness of layers of fat on the carcass of an animal comprising, applying ultra-acoustic waves to the carcass locally from a meat side of the carcass in a direction toward the outside layers of fat for reflecting from a boundary between meat tissue and fat the acoustic waves and determining therefrom the thickness of the meat tissue in accordance with an ultra-acoustic impulse-echo method, comparing the thickness of said meat tissue with the overall thickness of said carcass to determine from said comparison the thickness of the outside layers of fat in a local zone in which said waves were applied, and prior to said comparison measuring the overall thickness of said carcass in the same locality and direction in which said acoustic waves are applied by mechanically gauging the carcass.

2. Apparatus for non-destructive measuring of the thickness of the outside layers of fat on an animal carcass comprising a forked instrument having a pair of prongs relatively displaceable for accepting therebetween a portion of a carcass for measurement of the thickness of the layers of fat thereon, first contact means comprising a first contact surface on one of said prongs for engaging meat tissue on said carcass and for applying ultrasonic acoustic waves locally on said carcass on the meat tissue of said carcass in a direction toward the outside layers of fat and thereby reflecting waves from the boundary between the meat tissue and said fat layers for measuring therefrom the thickness of said meat tissue, second contact means on the other prong comprising a second contact surface engageable with an outer surface of the carcass locally disposed substantially in a plane transverse to said carcass and in which said first contact means is substantially disposed, and measuring means secured to said prongs for measuring directly the distance between said contact surfaces corresponding substantially to the overall thickness of the carcass between the two contact surfaces, whereby the thickness of the fat is determined as a difference between the overall thickness of the carcass and the thickness of the meat tissue.

3. Apparatus for non-destructive measuring of the thickness of the outside layers of fat on an animal carcass comprising a forked instrument having a pair of prongs relatively displaceable for accepting therebetween a portion of a carcass for measurement of the thickness of the layers of fat thereon, first contact means comprising a transducer on one of said prongs and comprising a first contact surface for engaging meat tissue on said carcass and applying ultrasonic acoustic waves locally on said carcass on the meat tissue of said carcass in a direction toward the outside layers of fat and thereby reflecting waves from the boundary between the meat tissue and said fat layers for measuring therefrom the thickness of said meat tissue, means conected to receive reflected waves and for indicating visually the thickness of said meat tissue, second contact means on the other prong comprising a second contact surface engageable with an outer surface of the carcass locally disposed substantially in the axis of radiation of said transducer, and mechanical measuring means secured to said prongs for measuring directly the distance between said contact surfaces corresponding substantially to the overall thickness of the carcass between the two contact surfaces, whereby the thickness of the fat is determined as a difference between the overall thickness of the carcass and the thickness of the meat tissue.

4. Apparatus according to claim 3, in which said means for applying ultrasonic waves comprises an electronic oscillator for generating said waves and connected for applying said waves to said transducer.

5. Apparatus according to claim 3, in which said mechanical measuring means secured to said prongs comprises a pair of graduated scales relatively movable for jointly indicating visually at least the overall thickness of said carcass.

6. Apparatus according to claim 3, in which said mechanical measuring means secured to said prongs comprises a pair of rods telescopically arranged for displacement relatively to each other along a common axis and a pair of graduated scales secured thereto for movement relative to each other for reading therefrom the difference between the overall thickness of the carcass and the meat layers thereby to indicate the thickness of said fat layers.

7. Apparatus according to claim 3, in which said mechanical measuring means secured to said prongs comprises a graduated scale secured to one prong and indicating means connected to the other prong for movement relative to said scale for jointly therewith visually indicating at least the distance between said two contact surfaces.

8. Apparatus according to claim 3, in which said mechanical measuring means secured to said prongs comprises, a graduated first scale axially displaceable and a second scale, said second scale comprising a graduated tape, take-up means for automatically taking-up said second scale in response to relative movement of said prongs varying the distance between said surfaces, said second scale cooperating with said first scale for jointly reading therefrom thickness of said fat layers, said meat tissue, and the overall thickness of said carcass.

9. Apparatus according to claim 3, in which said mechanical measuring means secured to said prongs comprises a pair of parallel rods displaceable axially relative to one another when said prongs are variably spaced closer and further apart to receive said carcass between said contact surfaces, a pair of graduated scales connected to respective ones of said rods for indicating visually jointly at least the overall thickness of said carcass.

10. Apparatus according to claim 9, in which said scales comprise graduations in units of lengths reading in opposite directions, said scales and graduations thereon being disposed for reading thereon the thickness of said layers of fat and the thickness of said meat tissue.

References Cited by the Examiner
UNITED STATES PATENTS

| | | | |
|---|---|---|---|
| 2,280,226 | 4/42 | Firestone | 73—67.8 |
| 2,431,234 | 11/47 | Rassweiller et al. | 73—67.8 |
| 2,763,153 | 9/56 | Simjian | 73—67.8 |

RICHARD C. QUEISSER, *Primary Examiner.*

JOHN P. BEAUCHAMP, JOSEPH P. STRIZAK,
*Examiners.*